US008677057B1

(12) United States Patent
Cornwell et al.

(10) Patent No.: US 8,677,057 B1
(45) Date of Patent: *Mar. 18, 2014

(54) INITIATING MEMORY WEAR LEVELING

(75) Inventors: Michael J. Cornwell, San Jose, CA (US); Christopher P. Dudte, San Jose, CA (US); Nir Jacob Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/032,073

(22) Filed: Feb. 22, 2011

Related U.S. Application Data (63) Continuation of application No. 11/739,816, filed on Apr. 25, 2007, now Pat. No. 7,913,032.

(51) Int. Cl.
*G06F 12/00* (2006.01)

(52) U.S. Cl.
USPC ..... 711/103; 711/170; 711/167; 711/E12.009

(58) Field of Classification Search
USPC .......... 711/103, 154, E12.001, E12.008, 167, 711/170, E12.009
See application file for complete search history.

(56) References Cited

U.S. PATENT DOCUMENTS

| 4,974,181 | A | 11/1990 | Sinderson et al. |
|---|---|---|---|
| 5,224,070 | A | 6/1993 | Fandrich et al. |
| 5,450,365 | A | 9/1995 | Adachi |
| 5,473,753 | A | 12/1995 | Wells et al. |
| 5,577,194 | A | 11/1996 | Wells et al. |
| 5,592,641 | A | 1/1997 | Fandrich et al. |
| 5,602,775 | A | 2/1997 | Vo |
| 5,602,987 | A | 2/1997 | Harari et al. |
| 5,621,685 | A | 4/1997 | Cernea et al. |
| 5,633,824 | A | 5/1997 | Onuki |
| 5,671,229 | A | 9/1997 | Harari et al. |
| 5,719,808 | A | 2/1998 | Harari et al. |
| 5,737,240 | A | 4/1998 | Ellsworth |
| 5,848,009 | A | 12/1998 | Lee et al. |
| 5,880,996 | A | 3/1999 | Roohparvar |
| 6,014,755 | A | 1/2000 | Wells et al. |
| 6,052,306 | A | 4/2000 | Sedlak et al. |
| 6,075,941 | A | 6/2000 | Itoh et al. |
| 6,081,447 | A | 6/2000 | Lofgren et al. |
| 6,148,435 | A | 11/2000 | Bettman |
| 6,149,316 | A | 11/2000 | Harari et al. |

(Continued)

FOREIGN PATENT DOCUMENTS

| WO | WO 96/17460 | 6/1996 |
|---|---|---|
| WO | WO 98/15149 | 9/1998 |

OTHER PUBLICATIONS

K9XXG08UXM—Preliminary Flash Memory—Samsung Electronics, pp. 1-50.

(Continued)

*Primary Examiner* — Pierre-Michel Bataille
(74) *Attorney, Agent, or Firm* — Meyertons, Hood, Kivlin, Kowert & Goetzel, P.C.

(57) ABSTRACT

Systems and processes may use a host and an external host. The host may be a portable device that includes a memory, a memory controller, and a communication interface for communication with the external host. The portable device may receive a command signal from the external host and initiate a predetermined amount of wear leveling in response to the command signal.

13 Claims, 5 Drawing Sheets

(56) References Cited

U.S. PATENT DOCUMENTS

| | | | |
|---|---|---|---|
| 6,151,246 A | 11/2000 | So et al. |
| 6,249,890 B1 | 6/2001 | Ukani et al. |
| 6,260,156 B1 | 7/2001 | Garvin et al. |
| 6,269,025 B1 | 7/2001 | Hollmer et al. |
| 6,304,487 B1 | 10/2001 | Pawletko et al. |
| 6,334,027 B1 | 12/2001 | Fukuoka et al. |
| 6,381,670 B1 | 4/2002 | Lee et al. |
| 6,426,893 B1 | 7/2002 | Conley et al. |
| 6,470,413 B1 | 10/2002 | Ogawa |
| 6,516,381 B1 | 2/2003 | Hamilton et al. |
| 6,542,910 B2 | 4/2003 | Cork et al. |
| 6,567,930 B1 | 5/2003 | Moriya |
| 6,611,724 B1 | 8/2003 | Buda et al. |
| 6,611,907 B1 | 8/2003 | Maeda |
| 6,639,864 B2 | 10/2003 | Sundaram et al. |
| 6,662,314 B1 | 12/2003 | Iwata et al. |
| 6,708,289 B1 | 3/2004 | Kudo |
| 6,721,820 B2 | 4/2004 | Zilberman et al. |
| 6,728,913 B1 | 4/2004 | Parker |
| 6,747,827 B1 | 6/2004 | Bassett et al. |
| 6,748,562 B1 | 6/2004 | Krech, Jr. et al. |
| 6,754,765 B1 | 6/2004 | Chang et al. |
| 6,757,842 B2 | 6/2004 | Harari et al. |
| 6,763,424 B2 | 7/2004 | Conley |
| 6,772,276 B2 | 8/2004 | Dover |
| 6,895,464 B2 | 5/2005 | Chow et al. |
| 6,904,506 B2 | 6/2005 | Wu et al. |
| 6,914,846 B2 | 7/2005 | Harari et al. |
| 6,947,332 B2 | 9/2005 | Wallace et al. |
| 6,947,865 B1 | 9/2005 | Mimberg et al. |
| 6,956,769 B2 | 10/2005 | Lee |
| 6,982,919 B2 | 1/2006 | Kumahara et al. |
| 7,013,406 B2 | 3/2006 | Naveh et al. |
| 7,035,159 B2 | 4/2006 | Janzen et al. |
| 7,058,748 B1 | 6/2006 | Jacobs et al. |
| 7,065,689 B2 | 6/2006 | Chiu et al. |
| 7,068,456 B2 | 6/2006 | Walz |
| 7,100,168 B1 | 8/2006 | Wenzl |
| 7,127,622 B2 | 10/2006 | Schnepper |
| 7,137,011 B1 | 11/2006 | Harari et al. |
| 7,161,834 B2 | 1/2007 | Kumahara et al. |
| 7,162,569 B2 | 1/2007 | Conley et al. |
| 7,200,066 B2 | 4/2007 | Krenzke et al. |
| 7,237,046 B2 | 6/2007 | Paley et al. |
| 7,237,074 B2 | 6/2007 | Guterman et al. |
| 7,239,557 B2 | 7/2007 | Ha |
| 7,240,219 B2 | 7/2007 | Teicher et al. |
| 7,277,978 B2 | 10/2007 | Khatami et al. |
| 7,278,038 B2 | 10/2007 | Schnepper |
| 7,281,040 B1 | 10/2007 | Ly |
| 7,286,435 B2 | 10/2007 | Odate et al. |
| 7,304,891 B2 | 12/2007 | Kim |
| 7,318,181 B2 | 1/2008 | Naso et al. |
| 7,395,466 B2 | 7/2008 | Dempsey |
| 7,409,492 B2 * | 8/2008 | Tanaka et al. ............... 711/103 |
| 7,444,490 B2 | 10/2008 | Cases et al. |
| 7,464,306 B1 | 12/2008 | Furuhjelm et al. |
| 7,480,792 B2 | 1/2009 | Janzen et al. |
| 7,512,847 B2 | 3/2009 | Bychkov et al. |
| 7,606,966 B2 * | 10/2009 | Li et al. ............... 711/103 |
| 8,135,907 B2 * | 3/2012 | Moore et al. ............... 711/114 |
| 8,341,374 B2 * | 12/2012 | Kwon et al. ............... 711/167 |
| 2002/0156798 A1 | 10/2002 | Larue et al. |
| 2003/0021157 A1 | 1/2003 | Matsubara et al. |
| 2003/0033465 A1 | 2/2003 | Chien et al. |
| 2003/0041295 A1 | 2/2003 | Hou et al. |
| 2003/0111988 A1 | 6/2003 | Sundaram et al. |
| 2003/0131185 A1 | 7/2003 | Dover |
| 2004/0049627 A1 | 3/2004 | Piau et al. |
| 2004/0089717 A1 | 5/2004 | Harrari et al. |
| 2004/0145931 A1 | 7/2004 | Lin et al. |
| 2004/0157638 A1 | 8/2004 | Moran et al. |
| 2004/0172576 A1 | 9/2004 | Yoshii et al. |
| 2004/0174763 A1 | 9/2004 | Schnepper |
| 2004/0250092 A1 | 12/2004 | Hori et al. |
| 2004/0268165 A1 | 12/2004 | May et al. |
| 2005/0044454 A1 | 2/2005 | Moshayedi |
| 2005/0083726 A1 | 4/2005 | Auclair et al. |
| 2005/0152202 A1 | 7/2005 | Choi et al. |
| 2005/0188230 A1 | 8/2005 | Bilak |
| 2005/0204187 A1 | 9/2005 | Lee et al. |
| 2005/0226050 A1 | 10/2005 | Crosby |
| 2005/0281112 A1 | 12/2005 | Ito et al. |
| 2006/0005070 A1 | 1/2006 | Zimmer et al. |
| 2006/0010282 A1 | 1/2006 | Kim |
| 2006/0062052 A1 | 3/2006 | Kumahara et al. |
| 2006/0085670 A1 | 4/2006 | Carver et al. |
| 2006/0126415 A1 | 6/2006 | Matarrese et al. |
| 2006/0136900 A1 | 6/2006 | Kim et al. |
| 2006/0142977 A1 | 6/2006 | Oh et al. |
| 2006/0161728 A1 * | 7/2006 | Bennett et al. ............... 711/103 |
| 2006/0195708 A1 | 8/2006 | Kato et al. |
| 2006/0203556 A1 | 9/2006 | Chen et al. |
| 2006/0225073 A1 | 10/2006 | Akagawa et al. |
| 2006/0280019 A1 | 12/2006 | Burton et al. |
| 2007/0008801 A1 | 1/2007 | Chiang et al. |
| 2007/0014176 A1 | 1/2007 | Krenzke et al. |
| 2007/0055843 A1 | 3/2007 | Lameter |
| 2007/0183179 A1 | 8/2007 | Maeda et al. |
| 2007/0208904 A1 * | 9/2007 | Hsieh et al. ............... 711/103 |
| 2007/0233931 A1 * | 10/2007 | Tanaka et al. ............... 711/5 |
| 2008/0086275 A1 | 4/2008 | Astigarraga et al. |
| 2008/0140918 A1 * | 6/2008 | Sutardja ............... 711/103 |
| 2009/0138654 A1 * | 5/2009 | Sutardja ............... 711/103 |
| 2009/0150748 A1 | 6/2009 | Egner et al. |

OTHER PUBLICATIONS

"Common Flash Memory Interface Specification," Release 2.0, Dec. 1, 2001; pp. 1-25.

"17.3 RAIDO-Striping," by T. Rhodes and M. Stokely; FreeBSD Handbook, Chpt 17 GEOM: Modular Disk Transformation Framework; pp. 1-3.

"Two Technologies Compared: NOR vs. NAND White Paper," Jul. 3, 91-SR-012-04-8L, Rev 1.1, pp. 1-14.

"ATA Flash Disk Controller," 2004 Silicon Storage Technology, Inc.; pp. 1-76.

"512M 8 Bit / 1G 8 Bit NAND Flash Memory," Flash Memory, Samsung Electronics, pp. 1-38.

"RAID," SearchWinSystems.Com Learning Guide: Backup Solutions, pp. 1-3.

"Advanced Technology Attachment," http://foldoc.doc.ic.ac.uk/foldoc.

"Portalplayer, Inc.—Products," http://www.portalplayer.com/products/indeIDS_1/27/10.html, pp. 1-5.

PCT Invitation to Pay Additional Fees and, Where Applicable, Protest Fee, PCT/US2008/061463, mailed Sep. 11, 2008, 9 pages.

International Search Report and Written Opinion for PCT Application No. PCT/US2008/061463, dated Jan. 30, 2009, 14 pages.

Quantum Fireball SE 2.1/3.2/4.3/6.4/8.4 GB AT Product Manual, Oct. 1997, Quantum Corporation, 25 pages.

International Preliminary Report on Patentability for Application No. PCT/US2008/061463, dated Oct. 27, 2009, 9 pages.

Communication Pursuant to Article 94(3) EPC issued in EP 08 746 815.3-1225 on Jul. 9, 2010, 4 pages.

* cited by examiner

INITIATING MEMORY WEAR LEVELING

CLAIM OF PRIORITY

This application is a continuation of U.S. application Ser. No. 11/739,816, filed on Apr. 25, 2007, which is incorporated herein by reference.

TECHNICAL FIELD

The present invention relates to systems and processes for memory wear leveling, and more particularly to initiating memory wear leveling on a device.

BACKGROUND

Nonvolatile memory, such as flash memory, may have a finite life. Some NAND flash memory may wear or become unreliable after 10,000-1,000,000 cycles. Optical memory such as CD-RWs and DVD-RWs may wear after 1,000-100,000 cycles. Wear leveling may include a variety of operations to extend a life of a memory. Wear leveling may include processes such as replicating data on blocks or cells that have been erased fewer times. Wear leveling processes may include writing data first on blocks or cells of blocks that have been erased fewer times. Wear leveling procedures may include reordering logical block arrays (LBAs) so that data may be written to blocks that have been erased fewer times. For example, data may be stored on a first cell of a block more frequently than a fifth cell of a block. After a predetermined number of write/erase cycles, wear leveling may include modifying the LBAs such that data may be written on a fifth cell prior to being written on the first cell.

SUMMARY

Memory wear leveling may extend a life of a memory through various operations. Memory wear leveling may be initiated by an external host coupled to a host. A predetermined amount of memory wear leveling may be performed so that normal operations may not be substantially interrupted by wear leveling.

In one general aspect, a command signal may be received on a portable device with an electrically erasable memory and a predetermined amount of wear leveling may be initiated on the electrically erasable memory in response to receiving the command signal. The command signal may be received from the external host.

Implementations may include one or more of the following features. A determination may be made whether to initiate wear leveling on the electrically erasable memory. Determining whether to initiate wear leveling may be at least partially based on an amount of time lapsed between the receipt of a command signal and receipt of another command signal. A command signal may include a periodic command signal sent by the external host to the portable device across a temporary communication interface and/or inject or eject signal. A determination whether to initiate wear leveling may be at least partially based on the operating mode and/or the power source of the device. Wear leveling operations may be performed for about one second or less on the electrically erasable memory and/or may be performed on a predetermined portion of the electrically erasable memory. Wear leveling may include modifying at least a portion of LBA mapping and/or replicating data in at least a portion of a first block to at least another portion of the first block with a lower erase count. Wear leveling may include replicating data in at least a portion of a first block to at least portion of a second block with a lower erase count. Initiating a predetermined amount of wear leveling may include performing a predetermined type of wear leveling operations on the first memory.

In another general aspect, whether to initiate wear leveling on an electrically erasable memory of a portable device may be determined based on command signals received from an external host and a predetermined amount of wear leveling may be initiated on the electrically erasable memory.

Implementations may include one or more of the following features. A determination may be made whether a specified amount of time has lapsed between receiving command signals from an external system, and whether to initiate wear leveling may be determined at least partially based on whether the specified amount of time has lapsed. An operating mode of the device may be determined and the determination whether to initiate wear leveling may be based on the operating mode. A predetermined type of wear leveling may be initiated.

In one general aspect a portable device may include a communication interface, an electrically erasable memory, and a memory controller. A communication interface may couple an external host to the portable device and receive command signals from the external host. A memory controller may be coupled to the communication interface and operable to perform wear leveling operations on the electrically erasable memory in response to commands from the external host.

Implementations may include one or more of the following features. An external host may be temporarily coupled to the host. A memory may be a flash memory The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Figure 1:
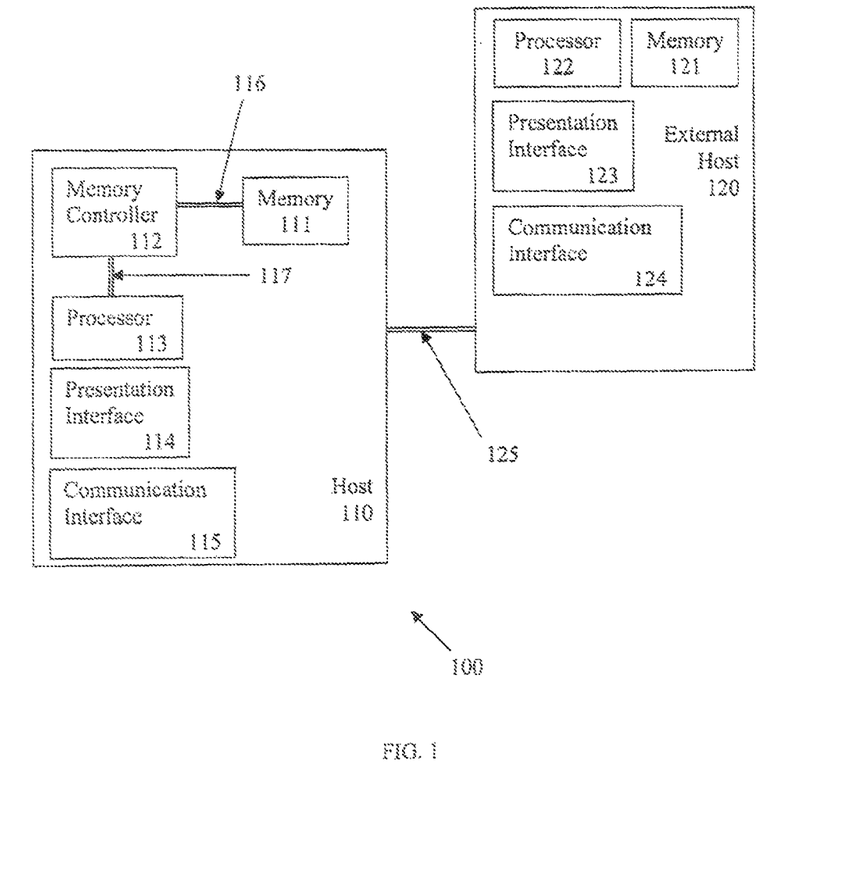
FIG. 1 illustrates examples of a host and an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may include individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), nonvolatile random-access memory (NVRAM), non-volatile static random-access memory (nvSRAM), phase-change memory (PRAM), and/or any other memory that does not need its memory contents periodically refreshed and/or can retain information without power. Memory 111 may include memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the block in which the cell resides. Similarly, writing new data to a portion of a block may require erasing the entire block and rewriting any unchanged portions of the block along with the new data.

Figure 2:
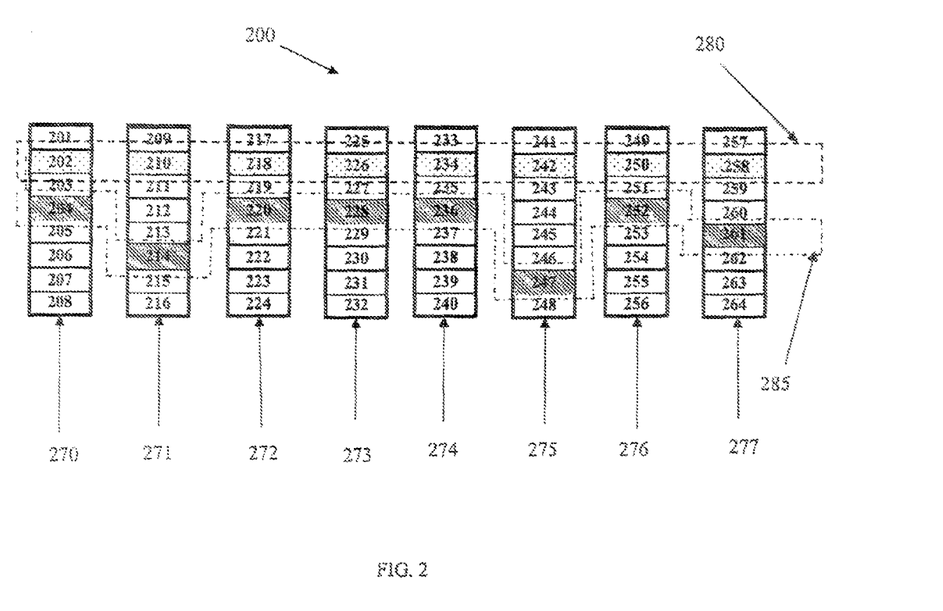
FIG. 2 illustrates an example of a memory controller coupled to a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216. The physical blocks 270-277 and cells 201-264 depicted in FIG. 2 are for purposes of illustration and do not represent a typical implementation. For example, in the case of flash memory, physical blocks typically include a much larger number of cells (e.g., sufficient to store 512 or 2048 bytes), which may be divided into pages (e.g., of 64 bytes), although any size of physical blocks and any number of cells can be used.

During operation, memory 111 may receive signals from memory controller 112 over Input/Output (I/O) bus 116, which enables memory 111 to carry out memory access requests (e.g., read or write operations) received by the memory controller 112 from the processor 113 (see FIG. 1). Memory 111 may be interleaved, so that read or write requests to logical block addresses 280, 285 (LBAs) are mapped to physical memory addresses that include two or more physical blocks 270-277 (see FIGS. 1 and 2). Interleaving may increase performance (e.g., by decreasing read and/or write times by allowing multiple parallel reads or writes) or protecting against lost data (e.g., by providing some degree of redundancy across different physical blocks) of memory 111. Host 110 (e.g., using processor 113) may perform reads and writes to LBAs 280, 285, which are mapped or translated (e.g., by memory controller 112) to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. In some situations, mapping may help make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs to increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Bus 117 may be an Integrated Drive Electronics (IDE)/Advanced Technology Attachment (ATA) bus that transfers control, address and data signals using IDE/ATA standard bus protocol (e.g., ATA-6 bus protocol). IDE/ATA signals may be generated by processor 113 and translated by the memory controller 112 into memory access requests in a format or protocol appropriate for communicating with the memory 111 across bus 116.

Processor 113 may include a programmable logic device, a microprocessor, or any other appropriate device for manipulating information in a logical manner. A processor may execute the operating system for the host. An example of processor 113 is a PP5002 Superintegration™ SoC controller manufactured by PortalPlayer, Inc. (San Jose, Calif.). The PP5002 controller may provide a platform for media player/recorder systems and/or other products that use non-volatile memory.

During use, an application running on processor 113 may request access to data stored on memory 111, see FIG. 1. For example, a user of a host 110 (e.g., a media player/recorder) or an external host 120 (e.g., a desktop or laptop computer) connected to the host 110 may submit a request to save a song to memory 111. A media player/recorder application may send the request to an operating system running on the processor 113, which formats the request into IDE/ATA signals. IDE/ATA signals may be transmitted to memory controller 112 on bus 117 by processor 113. Memory controller 112 may translate the request to access memory 111 via bus 116.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.). Utilizing an integrated processor 113 and memory controller 112 may decrease production cost of host 110, facilitate manufacture of host 110, and/or make process execution more efficient. For example, utilizing a single processor/memory controller decreases the number of steps in fabrication.

Presentation interface 114 may present data such as videos, music, messages from the host 105 and/or external host 120, graphical interface for various applications stored on the host (e.g., graphical interface for playing music, videos, manipulating data, etc). For example, presentation interface 114 may present data in visual and/or audio format. Presentation interface 114 may include display device, such as a screen, and/or speakers. Presentation interface may include a graphical interface.

Communication interface 115 may allow communication with other devices. Communication interface 115 may transmit data from host 110 to, and/or receive data from, external host 120 via network protocols (e.g., TCP/IP, Bluetooth, and/or Wi-Fi) and/or a bus (e.g., serial, parallel, USB, and/or FireWire).

Figure 3:
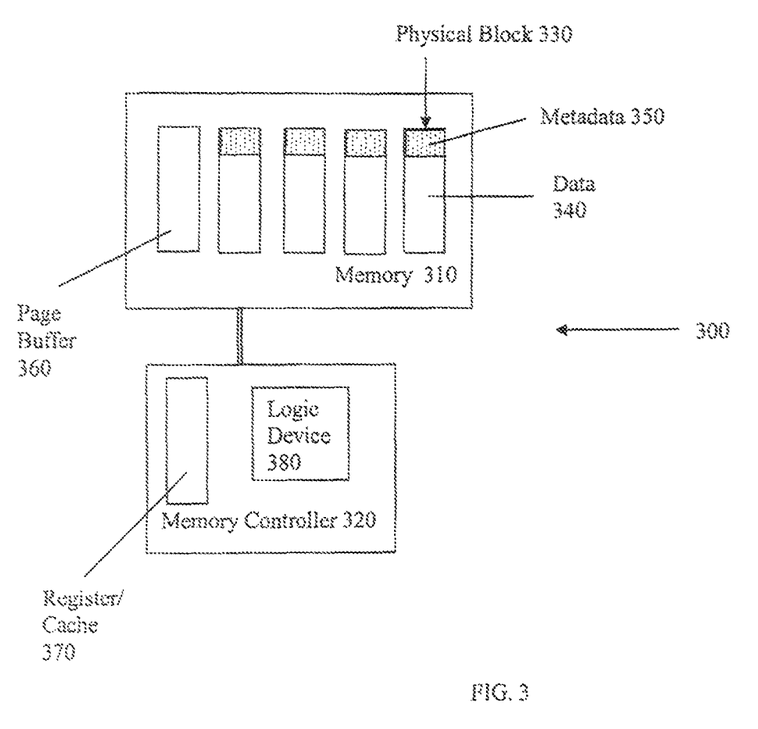
FIG. 3 illustrates an example configuration of a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. Memory 310 may include a first buffer 360 (e.g., a page buffer) that is used to temporarily store data as it is being written to or read from the blocks 330. Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360 and 370 to facilitate operations (e.g., read or write), facilitate random data access operations, and/or increase performance. For example, memory controller 320 may read data from memory 310. In response to a read request from memory controller 320, data from data portion 340 of memory 310 may be loaded into first buffer 360 (e.g., data register or page register). The data in the first buffer 360 may be transmitted to second buffer 370 (e.g., cache, register, or cache register) which is coupled to memory controller 320. The second buffer 370 may accumulate multiple pages of data from the first buffer. Memory controller 320 may reformat data from second buffer 370 for delivery to processor 113 of the host 110 (see FIG. 1) (e.g., in IDE/ATA format). While or after data is transferred from first buffer 360 to second buffer 370, additional data may be loaded from data portions 340 of memory 310 to the first buffer 360.

Memory controller 320 may also input data received from a host or external host into second buffer 370 (e.g., cache) for programming of the array through first buffer 360.

The memory controller 320 may receive requests to read and/or write data to memory 310. The memory controller 320 may format the requests to an instruction format appropriate for the memory 310 (e.g., from or to IDE/ATA format). The memory controller 320 may then transfer the instructions in the appropriate format to the memory 310. The requests in the memory 310 may then be converted to the appropriate electrical charges or the appropriate portions of the memory may be transferred to the second buffer.

Although the above description discusses portions of each block as being for data and/or for metadata, portions of a block that are used for data or metadata may not be fixed. A particular portion of a block may include metadata at some times and include user data or other data at other times.

Host 110 may be coupled to an external host 120, as illustrated in FIG. 1, to transmit and/or receive data. For example, songs and/or videos may be downloaded from external host 120 (e.g., computer) to host 110, which may be a media player or other portable device. As another example, applications, such as firmware, operating systems, software for playing MP3s, software for playing videos and/or upgrades, updates, and/or modifications to applications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 using a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted using one or more network protocols (e.g., TCP/IP, Wi-Fi, 802.11g, 802.11n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

Wear leveling may increase the life and/or performance of nonvolatile memory, such as electrically erasable memory. Some types of electrically erasable nonvolatile memory (e.g., flash, FeRAM, MRAM) may have a limited life due to their finite number of write/erase cycles. Wear leveling procedures may increase the life of a memory and/or inhibit premature failure of a memory.

Wear leveling procedures may be any process designed to increase a life of a memory by attempting to reduce erasing, writing, or reading of certain portions of the memory and/or rearranging data stored on the memory according to wear patterns of the memory. Wear leveling may include determining that certain cells or physical blocks are used more than other cells or physical blocks and moving the data to the other less used cells and/or physical blocks. Wear leveling may determine the write or erase count for cells or blocks and move data based on the write or erase counts (e.g., move data to cells or blocks with lower write or erase counts). Wear leveling procedures may include rewriting data from unreliable cells or blocks (e.g., cells that may not erase well) to other available cells or blocks. Wear leveling procedures may include reviewing block tables for candidates for wear leveling procedures.

In some implementations, wear leveling may include modifying virtual blocks and/or LBAs. For example, bad blocks and/or blocks with write or erase counts higher than a specified amount may not be included in the virtual block table. As another example, frequently written blocks, such as the first block in a LBA, may be removed from a virtual block table or the ordering of the block may be modified in the virtual block table. Modifying the virtual block table may affect LBAs. LBAs may be remapped to virtual blocks. Metadata may include the mapping of physical blocks to virtual blocks and/or virtual blocks to logical blocks. Mapping metadata may be modified based on the analysis of the erase counts. For example, LBA 280 may be reordered if block 210 is bad and blocks 242 and 258 have high erase counts. Data in blocks 210, 242, and 258 may be replicated on blocks 214, 247, and 261, respectively forming a new LBA 285, as illustrated in FIG. 2. Mapping metadata that describes mapping between physical blocks, virtual blocks, and/or logical blocks may be modified based on the modifications due to wear leveling procedures. In some implementations, mapping between the physical blocks and virtual blocks may be modified but mapping between the virtual blocks and LBAs may not be modified. For example, although the physical block in which data is stored is changed, it may appear to the processor that no changes have occurred since the LBA remains unchanged. In some implementations, the LBA may be modified so that frequently used blocks or blocks with write or erase counts higher than a specified value are assigned at the end of a LBA (e.g., the blocks that are written last in the LBA). These processes may facilitate the host's processor operations.

Figure 4:
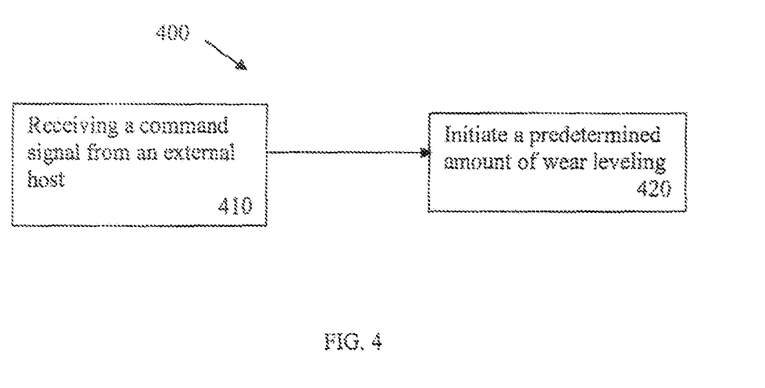
FIG. 4 illustrates an example process for initiating wear leveling.

FIG. 4 illustrates an example process 400 for wear management for a memory of a host (e.g., a portable device). A host may have an electrically erasable memory, such as a NAND flash memory. The host may receive a command signal from an external host (operation 410). For example, the host may be coupled to an external host using a temporary connection such as a USB bus, FireWire, or Bluetooth.

Command signals may include read commands, write commands, erase commands, status commands (e.g., is the host ready, or test unit ready (TUR) commands), inject commands (e.g., signal that the external host and host are being connected), eject commands (e.g., the external host and the host are being disconnected or the host is being ejected from the external host), or other commands. Command signals may be sent periodically or as needed by the external host to the host. For example, an external host may periodically transmit status commands (e.g., TUR commands) to the host. As another example, an external host may transmit read commands when prompted by an application of the external host. An external host may transmit write and/or erase commands to be executed by the processor of the host.

A predetermined amount of wear leveling on the electrically erasable memory may be initiated in response to receiving the command signals (operation 420). Wear leveling may be initiated and/or controlled by the memory controller and/or the processor of the host. Wear leveling may occur for a predetermined amount of time and/or to a predetermined portion of the memory. A predetermined amount of wear leveling may include performing specified wear leveling tasks, such as review of block tables. A predetermined amount of wear leveling may be a finite amount of wear leveling. For example, a predetermined amount of wear leveling may include specific wear leveling tasks, wear leveling on a specified portion of a memory (e.g., specific cells or blocks), wear leveling on a predetermined amount of the memory (e.g., 10 cells or 1 block), and/or wear leveling for a specified amount of time (e.g., 1 second).

A predetermined amount of wear leveling may be initiated such that wear leveling operations do not substantially interfere with other operations (e.g., normal operations such as transfer of data from the external host to the host, playback of media stored by the host, and/or synchronization data of an external host with a host). A predetermined amount of wear leveling may be initiated such that periods of wear leveling activity do not substantially inhibit a user from operating the host. In some implementations, wear leveling may be initiated for a longer period than is customary, such as when wear leveling has not been initiated for a specified period and/or when specified conditions occur (e.g., one or more blocks have high erase counts).

In some implementations, the type of command signal received may be determined. The determined type of command signal may affect whether to wear-leveling is initiated. Wear-leveling may be initiated when the processor of the host is not performing other operations and/or when the processor is not performing a substantially large operation or a plurality of operations. For example, if a first command signal is a status signal command and a second command signal is a write command, then wear leveling may not be initiated. As another example, if the first command signal is a write command signal and the second command signal is a read command signal, then wear management may not be initiated.

In some implementations, the type of command signal and the time between command signals may be used to determine whether to initiate wear management activities. For example, when a time between status signals (e.g., TUR signals) is 3 seconds, wear leveling may be initiated. Wear leveling may be initiated when commands received are status signals because the processor of the host may not be performing other operations. As another example, when a first command signals is a read command signal and the next command signal is a status signal that is received 10 seconds later, wear leveling may be initiated. As another example, when a first command signal is a status signal and a read command signal is received 2 seconds later, wear leveling may not be initiated. Since the processor may be performing the received read command signal, even if the 2 seconds between command signals satisfies a criterion to initiate wear leveling, wear leveling may not be initiated since the second command signal received was an operational command signal (e.g., performs or requests performance of an operation on or by the processor of the host).

Figure 5:
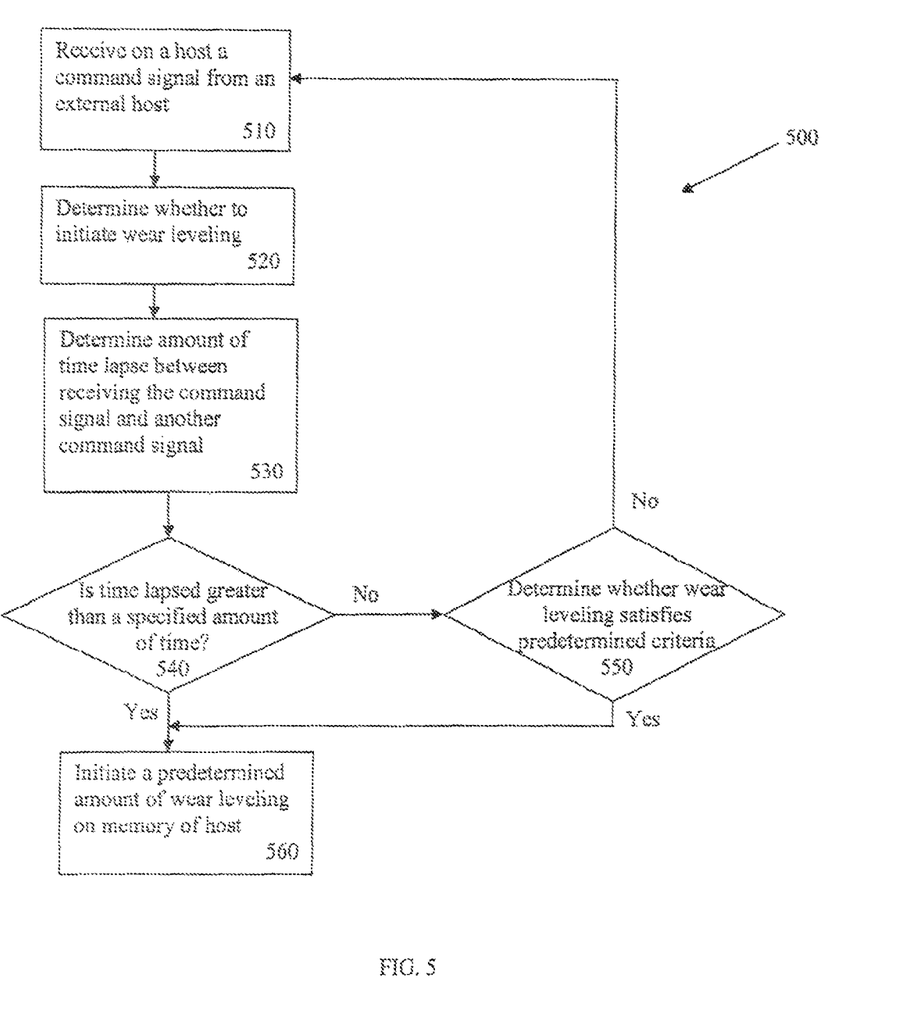
FIG. 5 illustrates an example process determining whether to initiate wear leveling.

FIG. 5 illustrates an example of a process 500 for wear management for a memory. A command signal may be received from an external host (operation 510). For example, the host may receive a command from the external host requesting confirmation that the host is ready for a command. The host may receive a write command or series of write commands from the external host. A connection between the external host and host may be detected, in some implementations. The external host may be directly coupled using a bus or indirectly coupled using a network protocol to the host.

The host may determine whether to initiate wear leveling (operation 520). For example, the operating mode of the host may be determined. In some implementations, when the host is in a playback mode, wear leveling may be inhibited. A host may determine to initiate wear leveling when a host is in a write mode (e.g., when coupled to an external host) so that data reading or playback is not inhibited, user directed applications on the host are not slowed by wear leveling, and/or so that the external host may be used as a power source for the host. A host may determine whether to initiate wear leveling based on the power source of the host. For example, if the host is a portable device, wear leveling may be inhibited while the host operates on battery power to conserve power. Wear leveling may be initiated when the host is coupled to a power source such as an electrical outlet through an adapter or coupled to the external host. A host may determine to initiate wear leveling when a power level (e.g., a percentage of battery power remaining) of a power source coupled to the host exceeds a specified value.

In some implementations, a host may determine whether to initiate wear leveling based on the command signals received from the external host. For example, a host may determine whether to initiate wear leveling based on the timing of command signals. An amount of time lapsed between receiving the command signal and receiving another command signal may be determined (operation 530). For example, an amount of time lapsed between receiving a write command and a status command may be determined. As another example, an amount of time lapsed between read commands may be determined.

A determination may be made whether the amount of time lapsed is greater than a specified amount (operation 540). For example, when a specified amount of time passes between receiving command signals from the external host, wear leveling may be initiated. As another example, a host may receive command signals, such as status signals, at a predetermined interval, when an amount of time lapsed between receiving command signals is approximately equal to the predetermined interval, wear leveling may be initiated. Wear leveling may be initiated when a fraction of the predefined interval has lapsed between receiving commands. Wear leveling may be initiated when a predetermined amount of time has lapsed since receiving a command signal relating to a substantive operation (e.g., other than a status request or response).

If the amount of time lapsed does not exceed a specified amount, a determination may be made whether wear leveling to be performed satisfies predetermined criteria (operation 560). For example, predetermined criteria may be based on an amount of time lapsed since the last wear leveling operation, extent of wear leveling to be performed on memory of host, or type of wear leveling to be performed on the host. If wear leveling satisfies predetermined criteria, then a predetermined amount of wear leveling may be initiated on the host (operation 550). For example, if the amount of time lapsed since the last wear leveling operation exceeds a specified amount of time, a predetermined amount of wear leveling may be initiated. As another example, if the type of wear leveling to be performed is of a specified type (e.g., critical wear leveling for continued satisfactory performance of the memory) and/or execution of the type of wear leveling to be performed takes less than a specified amount of time, then a predetermined amount of wear leveling may be initiated. If wear leveling does not satisfy predetermined criteria, a host may inhibit wear leveling operations and/or wait to receive another command signal from the external host (operation 510).

If the amount of time lapsed between receiving a command signal and another command signal is greater than a specified amount, then a predetermined amount of wear leveling may be initiated (operation 550). For example, wear leveling may be initiated for a specified time, on specified cells or blocks, and/or for a specified number of cells or blocks.

In some implementations, a host may receive periodic command signals (e.g., status signals, which may not be operational commands such as, read, write, and/or erase commands) approximately every second from an external host. A host may also receive other command signals such as, read and/or write signals. A host may determine whether to initiate wear leveling based on criteria such as the type of command signal and/or the amount of time lapsed between receiving command signals. For example, since the host receives periodic command signals approximately every second, the host may initiate wear leveling when the amount of time lapsed between receiving commands is approximately a second or a specified fraction of a second (e.g. 0.95 seconds, 0.75 seconds, etc).

The host may then initiate a predetermined amount of wear leveling. For example, the host may initiate approximately 0.25 seconds of wear leveling. A host may continue to initiate a predetermine amount of wear leveling, when possible, based on satisfying the criteria, and thus inhibit wear leveling operations from interfering with other operations of the host and/or external host. The predetermined amount of wear leveling performed may be based on the criteria used to determine whether wear leveling should be initiated. For example, a host may receive periodic status signals from the external host every second. If the criteria to determine whether to initiate wear leveling is whether 0.8 seconds have lapsed between command signals, then if wear leveling is initiated, 0.25 seconds of wear leveling may be performed. However, if criteria to determine whether to initiate wear leveling is whether 0.5 seconds have lapsed between command signals, then if wear leveling is initiated, 0.1 seconds of wear leveling may be performed. As another example, if criteria to determine whether to initiate wear leveling is whether 0.5 seconds have lapsed between command signals, then if wear leveling is initiated, 0.3 seconds of wear leveling may be performed.

For example, a host may be a portable media player. Although wear leveling may prolong the life of memory in the media player, it may interfere with media playback. Thus, wear leveling may be inhibited when the media player is in playback mode and initiated when the media player is other modes. Controlling the initiation and duration of wear leveling may allow the user to operate the media player without interference (e.g., slower response times) from wear leveling operations while still utilizing wear leveling procedures to prolong a memory life.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, a connection between the external host and the host may be detected. As another example, wear leveling procedures may be terminated if the connection between the external host and the host is removed. Among other modifications, the described operations may be performed in a different order than is described and some operations may be added or deleted. For example, whether wear leveling satisfies predetermined criteria may not be determined. As another example, an external host or an application of the external host may transmit a message to the host to initiate wear leveling. Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a memory" includes mixtures of different types of memories.

What is claimed is:

1. A method for managing memory comprising:
  receiving, at a portable device, a first command signal at a first time and a second command signal at a second time, wherein the first time is not the same as the second time;
  wherein the portable device includes an electrically erasable memory;
  determining an operating mode of the portable device;
  determining a difference between the first time; and
  initiating a predetermined amount of wear leveling on the electrically erasable memory dependent upon the determined operating mode and responsive to a determination that the determined difference between the first time and second time is greater than a predetermined amount of time.

2. The method of claim 1, wherein the command signals include a periodic command signal sent by the user device to the portable device through a temporary communication interface.

3. The method of claim 1, wherein the command signals include an inject or eject signal.

4. The method of claim 1 wherein initiating the predetermined amount of wear leveling comprises at least one of performing wear leveling operations for about one second or less on the electrically erasable memory, performing wear leveling operations on a predetermined portion of the electrically erasable memory, or performing a predetermined type of wear leveling operations on a first memory.

5. The method of claim 1, wherein wear leveling comprises at least one of modifying at least a portion of Logical Block Address (LBA) mapping, replicating data in at least a portion of a first block to at least another portion of the first block with a lower erase count, or replicating data in at least a portion of a first block to at least a portion of a second block with a lower erase count.

6. A portable device comprising:
  a communication interface configured to be coupled to an external host, wherein the communication interface is configured to receive a first command signal at a first time and a second command signal at a second time, wherein the first time is not the same as the second time;
  an electrically erasable memory; and
  a memory controller coupled to the communication interface, wherein the memory controller is configured to:
    determine an operating mode of the portable device;
    determine a difference between the first time and the second time; and
    initiate a predetermined amount of wear leveling on the electrically erasable memory dependent upon the determined operating mode, and responsive to a determination that the determined difference between the first time and the second time is greater than a predetermined amount of time.

7. The portable device of claim 6, wherein the memory controller operable to initiate the predetermined amount of wear leveling comprises the memory controller operable to perform at least one of wear leveling operations for about one second or less on the electrically erasable memory, wear leveling operations on a predetermined portion of the electrically erasable memory, or a predetermined type of wear leveling operations on a first memory.

8. The portable device of claim 6, wherein wear leveling comprises at least one of modifying at least a portion of Logical Block Address (LBA) mapping, replicating data in at least a portion of a first block to at least another portion of the first block with a lower erase count, or replicating data in at least a portion of a first block to at least a portion of a second block with a lower erase count.

9. A computer program product encoded on a non-transitory, tangible storage medium, the product comprising computer readable instructions for causing one or more processors to perform operations comprising:
  receiving at a portable device, a first command signal at a first time and a second command signal at a second time, wherein the first time is not the same as the second time;
  wherein the portable device includes an electrically erasable memory;
  determining an operating mode of the portably device;
  determining a difference between the first time and the second time; and
  initiating a predetermined amount of wear leveling on the electrically erasable memory dependent upon the determined operating mode and responsive to a determination that the determined difference between the first time and the second time is greater than a predetermined amount of time.

10. The computer program product of claim 9, wherein the command signals includes a periodic command signal sent by the user device to the portable device through a temporary communication interface.

11. The computer program product of claim 9, wherein the command signals include an inject or eject signal.

12. The computer program product of claim 9, wherein initiating the predetermined amount of wear leveling comprises at least one of performing wear leveling operations for about one second or less on the electrically erasable memory, performing wear leveling operations on a predetermined portion of the electrically erasable memory, or performing a predetermined type of wear leveling operations on a first memory.

13. The computer program product of claim 9, wherein wear leveling comprises at least one of modifying at least a portion of Logical Block Address (LBA) mapping, replicating data in at least a portion of a first block to at least another portion of the first block with a lower erase count, or replicating data in at least a portion of a first block to at least a portion of a second block with a lower erase count.

* * * * *